United States Patent
Tripp et al.

(10) Patent No.: US 9,535,824 B2
(45) Date of Patent: Jan. 3, 2017

(54) PAYLOAD GENERATION FOR COMPUTER SOFTWARE TESTING

(71) Applicant: International Business Machines Corporation, Armonk, NY (US)

(72) Inventors: Omer Tripp, Bronx, NY (US); Emmanuel Wurth, Saubens (FR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/467,460

(22) Filed: Aug. 25, 2014

(65) Prior Publication Data

US 2015/0178183 A1    Jun. 25, 2015

(30) Foreign Application Priority Data

Dec. 24, 2013   (GB) .................................. 1322993.5

(51) Int. Cl.
  *G06F 9/44*    (2006.01)
  *G06F 11/36*   (2006.01)
  *G06F 21/57*   (2013.01)

(52) U.S. Cl.
  CPC ......... *G06F 11/3684* (2013.01); *G06F 21/577* (2013.01)

(58) Field of Classification Search
  CPC .. G06F 11/3608; G06F 11/3684; G06F 21/577
  USPC ................................................ 717/123, 126
  See application file for complete search history.

(56) References Cited

U.S. PATENT DOCUMENTS

| | | | |
|---|---|---|---|
| 5,892,947 A | 4/1999 | DeLong et al. | |
| 6,253,374 B1* | 6/2001 | Dresevic et al. | 717/126 |
| 6,502,232 B1* | 12/2002 | Campenhout | 716/106 |
| 7,530,107 B1 | 5/2009 | Ono et al. | |
| 7,975,296 B2 | 7/2011 | Apfelbaum et al. | |
| 8,302,080 B2 | 10/2012 | Wassermann et al. | |
| 2002/0038447 A1* | 3/2002 | Kim et al. | 716/4 |
| 2008/0082969 A1* | 4/2008 | Agha et al. | 717/130 |
| 2009/0006897 A1 | 1/2009 | Sarsfield | |
| 2009/0125976 A1* | 5/2009 | Wassermann et al. | 726/1 |
| 2012/0011489 A1 | 1/2012 | Murthy et al. | |
| 2013/0055402 A1 | 2/2013 | Amit et al. | |
| 2013/0174262 A1 | 7/2013 | Amit et al. | |

FOREIGN PATENT DOCUMENTS

CN           103164330 A     6/2013

OTHER PUBLICATIONS

Chandra et al. "Snugglebug: A Powerful Approach to Weakest Preconditions" Jun. 2009, ACM, PLDI '09, pp. 363-374.*

(Continued)

*Primary Examiner* — James D Rutten
(74) *Attorney, Agent, or Firm* — Cantor Colburn LLP; Maeve Carpenter

(57) ABSTRACT

A method of generating test payloads for a target system includes receiving a plurality of reference programs, each reference program modelling at least one aspect of the target system, building a specification for each received reference program, each specification defining illegal states for the respective reference program, analyzing each specification to determine one or more entry constraints that would generate an illegal state from a specific input, and synthesizing one or more payloads from the determined entry constraints.

15 Claims, 4 Drawing Sheets

(56) References Cited

OTHER PUBLICATIONS

Shay Artzi, et al.; "Finding Bugs in Web Applications Using Dynamic Test Generation and Explicit State Model Checking"; Computer Science and Artificial Intelligence Laboratory Technical Report; p. 1-19; Mar. 26, 2009.
Satish Chandra, et al.; "Snugglebug: A Powerful Approach to Weakest Preconditions"; PLDI'09; p. 363-374; Jun. 15-20, 2009.
Xiang Fu; "Relational Constraint Driven Test Case Synthesis for Web Applications"; Salaun, Fu, and Halle (Eds.): Fourth International Workshop on Testing, Analysis and Verification of Web Software EPTCS; vol. 35; p. 39-50; 2010.
Great Britain Search Report dated May 29, 2014 for Application No. 1322993.5.
Nuo Li, et al.; "Perturbation-Based User-Input-Validation Testing of Web Applications"; The Journal of Systems and Software vol. 83; p. 2263-2274; 2010.
Prateek Saxena; "Systematic Techniques for Finding and Preventing Script Injection Vulnerabilities"; Electrical Engineering and Computer Sciences University of California at Berkeley; Technical Report No. UCB/EECS-2012-170; p. 1-168; Jun. 29, 2012.
Kunal Taneja, et al.; "MiTV: Multiple-Implementation Testing of User-Input Validators for Web Applications"; ASE '10; p. 1-4; Sep. 20-24, 2010.
Takaaki Tateishi, et al.; "Path- and Index-Sensitive String Analysis Based on Monadic Second-Order Logic"; ISSTA '11; p. 166-176; Jul. 17-21, 2011.
Omer Tripp, et al.; "TAJ: Effective Taint Analysis of Web Applications"; PLDI'0; p. 1-11; Jun. 15-20, 2009.

\* cited by examiner

PAYLOAD GENERATION FOR COMPUTER SOFTWARE TESTING

FOREIGN PRIORITY

This application claims priority to Great Britain Patent Application No. 1322993.5 filed Dec. 24, 2013, and all the benefits accruing therefrom under 35 U.S.C. §119, the contents of which in its entirety are herein incorporated by reference.

BACKGROUND

This invention relates to computer software testing systems and, more specifically, to the automatic synthesis of payloads for functional software testing with particular application in the security testing of web services.

The functional testing of software systems has many applications, including bug finding, security assessment, accessibility and compatibility checking, for example. A key difficulty in building and deploying a testing solution is to come up with quality test payloads, which are likely to exercise the subject application in an effective way. This has traditionally been known to require domain knowledge and expertise, which left the task of constructing effective payloads in the hands of domain experts. For example, an entire team of security experts may be assigned the job of building tests and maintaining the test suite according to repositories of attack reports.

SUMMARY

According to an illustrative embodiment, a method of generating test payloads for a target system includes receiving a plurality of reference programs, each reference program modelling at least one aspect of the target system. A specification for each received reference program is built in which each specification defines illegal states for the respective reference program. Each specification is analyzed to determine one or more entry constraints that would generate an illegal state from a specific input. One or more payloads are synthesized from the determined entry constraints.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Figure 1:
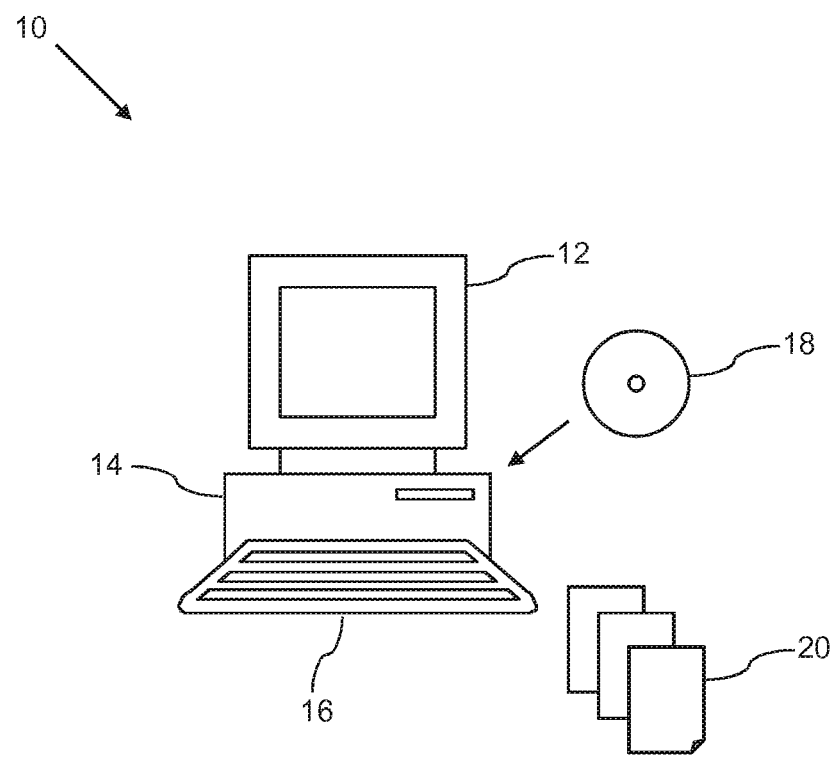
FIG. 1 is a schematic diagram of a computing system in accordance with an embodiment.

An illustrative embodiment includes a method of generating test payloads for a target system. The method includes receiving a plurality of reference programs, each reference program modelling at least one aspect of the target system. A specification for each received reference program is built in which each specification defines illegal states for the respective reference program. Each specification is analyzed to determine one or more entry constraints that would generate an illegal state from a specific input. One or more payloads are synthesized from the determined entry constraints.

Conventional application testing approaches have several limitations. Firstly the labour going into synthesizing high-quality payloads creates a significant manual burden. This is a burdensome and error-prone task, which requires considerable time and dedication. For this reason, as noted earlier, leading commercial products assign large teams of top researchers and engineers to this task. Secondly, there is a requirement to stay in synchronization. Beyond authoring the initial test suite, there is the continuous need to evolve the suite, maintain it, update it and ensure its relevance. This is a problem both for the development team (which goes back to the first point about the large manual burden), but even more importantly, this also impacts the end customers, who have to continually install software updates and ensure that their version of the product is in sync with the most recent test suite. For many users, for example, this is an onerous requirement. Thirdly, there is a requirement for specialized tests. Finally, because the manual complications going into generating test payloads are significant, the goal of tailoring different payloads to different categories of subject applications is largely out of reach. In practice, however, the business logic of an online transaction processing application (such as a reservation system) is sufficiently different from the behavior of a social application to merit different tests.

According to an aspect of the illustrative embodiment, a system for generating test payloads for a target system includes a processor arranged to receive a plurality of reference programs, each reference program modelling at least one aspect of the target system, build a specification for each received reference program, each specification defining illegal states for the respective reference program, analyze each specification to determine one or more entry constraints that would generate an illegal state from a specific input, and synthesize one or more payloads from the determined entry constraints.

According to another aspect, a computer program product on a computer readable medium generates test payloads for a target system. The program includes instructions for receiving a plurality of reference programs, each reference program modelling at least one aspect of the target system, building a specification for each received reference program, each specification defining illegal states for the respective reference program, analyzing each specification to determine one or more entry constraints that would generate an illegal state from a specific input, and synthesizing one or more payloads from the determined entry constraints.

The embodiments thus provide for automatic synthesis of test payloads for a target system. The entire task of constructing the payloads is carried out automatically, which overcomes all three of the serious challenges listed above. The broad idea is to obtain a representative list of programs that model relevant business logic, apply static analysis to these programs to detect classes of payloads that would be effective in testing them, and using these seeding payloads to produce new payloads on their basis.

For example, this methodology works in the following manner. Firstly there is obtained a number of representative programs (p) that model pertinent aspects of the target business logic embodied by the target system. For each such program p, there is then built a specification for p that describes illegal states and control locations in the execution of p with respect to the functional property in question (for example a null receiver in a field-access statement in p, if the property is illegal pointer dereferences). For each specification, for each control location and violation state in the specification, p's (inter-procedural) control flow graph is traversed backwards to p's entry location to obtain constraints on the entry state of p, such that if the input state is compatible with these constraints, then the violation would occur. There is then applied a constraint solver to the entry constraints to synthesize an input payload that yields the desired input state. This operation can be carried out using, for example, analysis techniques such as the conventional weakest precondition methodology known as "snugglebug" referenced below.

Optionally, for the payloads obtained as described above, it is possible to generalize these payloads by computing structural invariants over these payloads and synthesize additional payloads that are compatible with these constraints. It can then be verified that these additional payloads are compatible with the constraints computed above, although another option is to request the constraint solver for multiple inputs.

FIG. 1 shows a computing system 10, which includes a display device 12, a processor 14 and a user interface 16 in accordance with an embodiment. The processor 14 is connected to the display device 12 and the user interface 16. The user interface 16 is a keyboard and additional user interface devices may also be provided, such as a mouse, which is also connected to the processor 14. The processor 14 controls the operation of the computing system 10, receiving user inputs from the user interface 16 and controlling the output of the display device 12. A computer program product on a computer readable medium 18, such as a CD-ROM, can be used to operate the processor 14.

The computing system 10 can be used to generate test payloads for a target system, using an application stored as a computer program product on the computer readable medium 18. The application includes a series of instructions that are executed by the processor 14, the output of which is one or more test payloads 20. The automatic generation of the payloads 20 is described in detail below. The target system can be any software system that needs to be tested for robustness and/or security. One or more payloads 20 are used to test the target system, for example to ensure that the target system does not have obvious security weaknesses.

A payload 20 is essentially anything that can be considered as an input to the target system. A payload 20 may include a simple text file, an HTML file, a computer program or a sequence of instructions or messages, for example. If the target system is an enterprise computing system that provides a web service that is accessible by the general public through the Internet, for example, then the security of the system will be of paramount importance, as malicious attacks can easily be made via the external interface to the web service. The system will need to have a very high level of robustness that is continually kept up-to-date.

Figure 2:
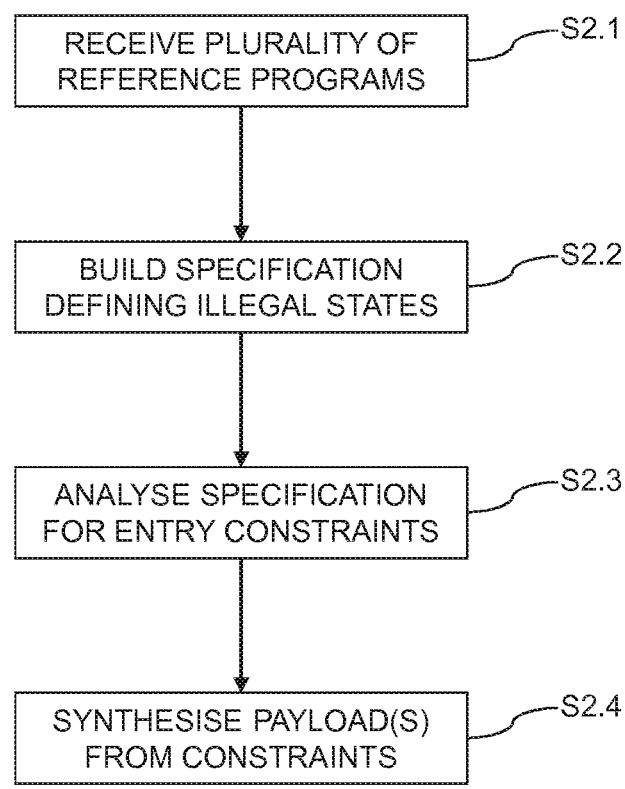
FIG. 2 is a flowchart of a method of generating test payloads in accordance with an embodiment.

The method of generating test payloads 20 for the target system is summarized in FIG. 2 in accordance with an embodiment. The procedure includes, firstly block S2.1, which includes receiving a plurality of reference programs, each reference program modelling at least one aspect of the target system. For example, in the security domain, a suitable reference program might include a validator which is designed to accept or reject an input. A validator is designed to detect security attacks by detecting specific malicious inputs to the target system and refusing the input. The reference programs are essentially the input to the process and they can be sourced according to the nature of the target system for which the new payloads 20 are being generated.

The next operation of the method illustrated by block S2.2, which includes building a specification for each received reference program, each specification defining illegal states for the respective reference program. The specifications that are created for the received reference programs can be defined, for example using conventional techniques, such as those known as TAJ and/or M2L. This portion of the method essentially transforms each received reference program into a specification format that can be the basis for synthesizing new payloads 20. Control locations within the reference program can also be defined within the specification as a basis for defining a control flow graph from the built specifications.

The third element of the method, block S2.3, includes analyzing each of the built specifications to determine one or more entry constraints that would generate an illegal state from a specific input, and the final operation of the method, block S2.4, includes synthesizing one or more payloads from the determined entry constraints. Using the specification of a reference program which has been built in block S2.2, constraints on the entry state of the respective reference program are obtained, such that an input state compatible with these constraints would generate an illegal state (block S2.3). A constraint solver is then used to synthesize new payloads that yield the desired input state (block S2.4).

Figure 3:
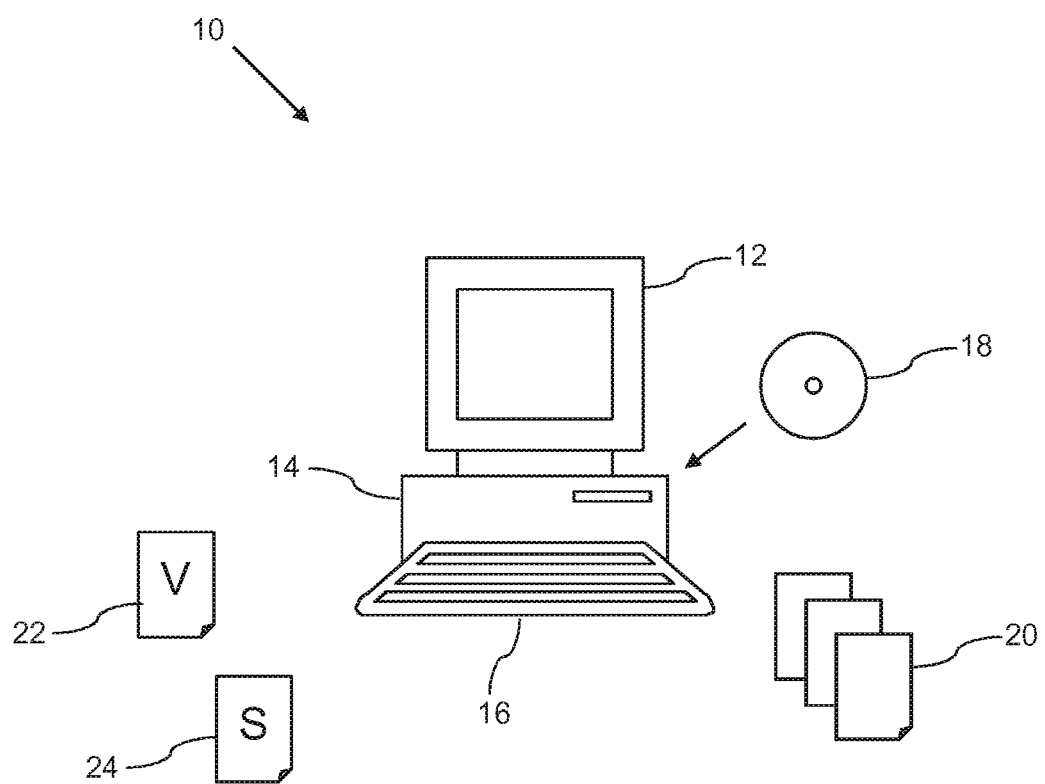
FIG. 3 is a further schematic diagram of a computing system in accordance with an embodiment.

The methodology for generating new test payloads has particular applicability in the security testing of web services. This can be explained in the following example, illustrated in the embodiment shown in FIG. 3. Here the target system is a web service. Firstly, there is obtained defence measures used in commercial as well as public web services to block security vulnerabilities as the reference programs. These divide into two categories: validators 22, which either accept or reject an input, and sanitizers 24, which conditionally modify the input data if it appears illegal or malicious. Common sources of such defences are organizations and consortiums whose theme is web security, such as open-source web services and in-house web services.

For each of the defence measures, whether a sanitizer or a validator, a standard security specification, such as TAJ or M2L which are referred to above, can be used to detect which exit values are illegal for each specific defence measure. For example, this might be a return value containing the "<" character in a cross-site scripting sanitizer. For each defence measure and the built specification, there is then applied the "snugglebug" analysis referred to above, to find input constraints, such that an input satisfying these constraints would yield a result for the defence measure that is considered incorrect. This static analysis determines the entry constraints that would generate an illegal state from a specific input and new payloads are synthesized from the constraints.

It is also possible to extract regular invariants over the newly synthesized payloads, for example in an illegal input, the "<" token always appears before the script token. It is then possible to synthesize additional payloads that match these constraints, and verify that they match the input constraints already computed from the specifications. Essentially this is applying a generalisation to the new payloads in order to create additional payloads that are also compatible with the input constraints that have been calculated from the static analysis of the specifications built from the reference programs (the sanitizers and validators in this example).

Figure 4:
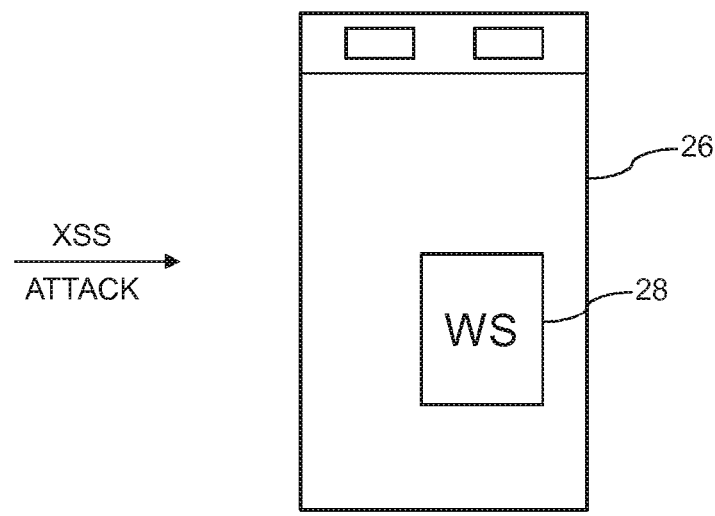
FIG. 4 is a schematic diagram of a target system in accordance with an embodiment.

For a more detailed example of the methodology, applied to the context of security testing of a web service, there follows an explanation in the context of an XSS attack, which is illustrated in the embodiment shown in FIG. 4. Cross-site scripting (XSS) is a type of computer security vulnerability typically found in web applications. XSS enables attackers to inject client side script into web pages that would then be viewed by other users. A cross-site scripting vulnerability may be used by attackers to bypass access controls such as a same origin policy. By design, such attacks consist of attempts to inject code (client side scripting) into a remote server 26 running a web service 28 using vulnerabilities, for example due to the permeability to such an injection due to a lack of sanitizer. Taking the example of a php script that will ask for parameters and will return the result of the input in terms of a form that compiles the previous parameters. In this example, the structure on the client side of the call (the payload) executed against the server will be:

input.php?name=the input name etc. . . .

The result of this page will be an html answer such as for example:

```
<!DOCTYPE html><html><body>. . .
<INPUT TYPE="TEXT" VALUE=" THE INPUT NAME "/>
. . . </body></html>
```

Note: in the next blocks, for ease of understanding, the example will only focus on the <input/> answer element for convenience. Assuming that there is no or only a partial sanitization for this php page such input:

```
"/><IMG SRC="javascript:alert('XSS');
could induce this answer:
<input type="text" value=""/><IMG SRC="javascript:alert('XSS');"/>
``` which shows that the server is vulnerable, since alert code has been injected. Existing organizations provides references in terms of security sanitizers and validators. This example illustrates the recognition and removal of specific XSS attack related patterns.

```
PUBLIC STATIC STRING STRIPXSS(STRING VALUE) {
if (value != null) {
// NOTE: It's highly recommended to use the ESAPI library and
uncomment the following line to // avoid encoded attacks.
    value = ESAPI.encoder( ).canonicalize(value);
    // Avoid null characters
    value = value.replaceAll("\0", "");
    // Avoid anything between script tags
    Pattern scriptPattern = Pattern.compile("<script>(.*?)</script>",
Pattern.CASE_INSENSITIVE);
    value = scriptPattern.matcher(value).replaceAll("");
    // Avoid iframes
    scriptPattern = Pattern.compile("<iframe(.*?)>(.*?)</iframe>",
Pattern.CASE_INSENSITIVE);
    value = scriptPattern.matcher(value).replaceAll("");
    // Avoid anything in a src='. . .' type of expression
    scriptPattern = Pattern.compile("src[\r\n]*=[\r\n]*\\\'(.*?)\\\'",
Pattern.CASE_INSENSITIVE | Pattern.MULTILINE | Pattern.DOTALL);
    value = scriptPattern.matcher(value).replaceAll("");
    scriptPattern = Pattern.compile("src[\r\n]*=[\r\n]*\\\"(.*?)\\\"",
Pattern.CASE_INSENSITIVE | Pattern.MULTILINE | Pattern.DOTALL);
    value = scriptPattern.matcher(value).replaceAll("");
    scriptPattern = Pattern.compile("src[\r\n]*=[\r\n]*([^>]+)",
```

-continued

```
Pattern.CASE_INSENSITIVE | Pattern.MULTILINE | Pattern.DOTALL);
    value = scriptPattern.matcher(value).replaceAll("");
    // Remove any lonesome </script> tag
    scriptPattern = Pattern.compile("</script>",
Pattern.CASE_INSENSITIVE);
    value = scriptPattern.matcher(value).replaceAll("");
    // Remove any lonesome <script . . .> tag
    scriptPattern = Pattern.compile("<script(.*?)>",
Pattern.CASE_INSENSITIVE | Pattern.MULTILINE | Pattern.DOTALL);
    value = scriptPattern.matcher(value).replaceAll("");
    // Avoid eval(. . .) expressions
    scriptPattern = Pattern.compile("eval\\((.*?)\\)",
Pattern.CASE_INSENSITIVE | Pattern.MULTILINE | Pattern.DOTALL);
    value = scriptPattern.matcher(value).replaceAll("");
    // Avoid expression(. . .) expressions
    scriptPattern = Pattern.compile("expression\\((.*?)\\)",
Pattern.CASE_INSENSITIVE | Pattern.MULTILINE | Pattern.DOTALL);
    value = scriptPattern.matcher(value).replaceAll("");
    // Avoid javascript: . . . expressions
    scriptPattern = Pattern.compile("javascript:",
Pattern.CASE_INSENSITIVE);
    value = scriptPattern.matcher(value).replaceAll("");
    // Avoid vbscript: . . . expressions
    scriptPattern = Pattern.compile("vbscript:",
Pattern.CASE_INSENSITIVE);
    value = scriptPattern.matcher(value).replaceAll("");
    // Avoid onload= expressions
    scriptPattern = Pattern.compile("onload(.*?)=",
Pattern.CASE_INSENSITIVE | Pattern.MULTILINE | Pattern.DOTALL);
    value = scriptPattern.matcher(value).replaceAll("");
}
return value;
}
```

The algorithm executed by the processor recognizes the goal of this sanitizer (because it checks for <script>, eval . . . and in a more general manner does not return < into its answer) in terms of XSS attack sanitization which is then modelled as the most general specification for this sanitizer in the style of M2L:

"$.*[<>].*$"

The meaning of this specification (expressed using M2L) is that returned values from this implementation should always return strings without the "<" and ">" characters. This specification is computed using goal recognition that allows the algorithm to extract the implementation intent using static analysis so that this intent is turned into an "ideal" security specification. This security specification can then be used to locate divergences into the implementation.

Now using the specification, the "snugglebug" static analysis is applied to the implementation so that potential input constraints that yield to an incorrect result for this defence measure are determined. The more general idea is to apply static analysis to the sanitizer/validator, which computes inputs, or input characteristics, that are able to drive the sanitizer/validator into a given result state, where the result state of interest is one that is illegal. For example, the sanitizer would fail to sanitize relevant security tokens, or the validator would accept an illegal input. Considering the specification built above, the application of the snugglebug algorithm would try to discover specific inputs that, once sanitized, would be turned into a string that still contains the "<" and/or ">" character(s), which are violations of the security specification.

Turning the previous sanitization implementation into a simpler case imaging the same method only focusing on the <script> case as follows:

```
// Avoid anything between script tags
    Pattern scriptPattern = Pattern.compile("<script>(.*?)</script>",
Pattern. CASE_INSENSITIVE);
    value = scriptPattern.matcher(value).replaceAll("");
```

The application of the algorithm will allow the discovery of the following constraints:

inputs starting with "<" return string with "<" inside.

inputs starting with "<" at second position return string with "<" inside.

inputs starting with "<" at third position return string with "<" inside. (ie: "/> <img src="javascriptalert('xssjavascript:alert('xss'))

etc. . . .

Once these constraints on the illegal inputs are discovered, a first set of payloads that allow the testing of failures of the implementation can created (i.e. any string with a "<" character at the first position will result in a string that still contains this character, for example). The method can then, extracting regular invariants, turn them into additional payloads that are both malicious from a security standpoint and are accepted by this sanitizer. The additional payloads would, for example with the context of this sanitization, consist of the creation of payloads that contain well known XSS attacks matching these constraints.

The methodology can be completed by extracting regular invariants over the synthesized payloads, for example, in an illegal input the "<" token always appears before the script token. It is possible to synthesize additional payloads that match these constraints, and verify that they match the input constraints computed above.

For example, in this simple case, regular invariants are for the third constraint that illegal inputs are starting with < at the third place so additional payload to be tested could be:

```
/><img src="javascript:alert('xssjavascript:alert('xss ');
/><img src=#onmouseover="alert('xxs')">
/><input type="image" src ="javascript:alert('xss');">
``` and then tested with the implementation to check if they are rejected. In this example, the fact that the sanitizer will accept the malicious payloads will be checked by computing the results of the sanitization of these new payloads and checking that the resulting sanitized value still contains the XSS attack, which is the case for the three examples listed above.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method of generating test payloads for a target system, the method comprising:
   receiving a plurality of reference programs, each reference program modelling business logic of at least one aspect of the target system,
   building a specification for each received reference program, each specification defining illegal states and control locations in the execution of the respective reference program with respect to a functional property,
   performing a static analysis of each specification to determine one or more entry constraints that, when input to the business logic, would generate an illegal state from a specific input compatible with the one or more entry constraints, the static analysis performed without executing the respective reference program, and
   synthesizing one or more payloads from the determined entry constraints.

2. A method according to claim 1, and further comprising computing structural invariant constraints over the synthesized payloads and synthesizing additional payloads compatible with the computed constraints.

3. A method according to claim 2, and further comprising verifying that the additional payloads are compatible with the determined entry constraints.

4. A method according to claim 1, wherein the step of analyzing each specification comprises traversing backwards a control flow graph of the control locations.

5. A method according to claim 1, wherein the target system is a web service and the at least one aspect of the target system includes a security function of the web service.

6. A system for generating test payloads for a target system, the system comprising a processor arranged to:
   receive a plurality of reference programs, each reference program modelling business logic of at least one aspect of the target system,
   build a specification for each received reference program, each specification defining illegal states and control locations in the execution of the respective reference program with respect to a functional property,
   perform a static analysis of each specification to determine one or more entry constraints that, when input to the business logic, would generate an illegal state from a specific input compatible with the one or more entry constraints, the static analysis performed without executing the respective reference program, and
   synthesize one or more payloads from the determined entry constraints.

7. A system according to claim 6, wherein the processor is further arranged to compute structural invariant constraints over the synthesized payloads and synthesize additional payloads compatible with the computed constraints.

8. A system according to claim 7, wherein the processor is further arranged to verify that the additional payloads are compatible with the determined entry constraints.

9. A system according to claim 6, wherein the processor is arranged, when analyzing each specification, to traverse backwards a control flow graph of the control locations.

10. A system according to claim 6, wherein the target system is a web service and the at least one aspect of the target system includes a security function of the web service.

11. A computer program product for generating test payloads for a target system, the computer program product comprising a computer readable storage medium having program instructions embodied therewith, the program instructions readable by a processing circuit to cause the processing circuit to perform a method comprising:
   receiving a plurality of reference programs, each reference program modelling business logic of at least one aspect of the target system,
   building a specification for each received reference program, each specification defining illegal states and control locations in the execution of the respective reference program with respect to a functional property,
   performing a static analysis of each specification to determine one or more entry constraints that, when input to the business logic, would generate an illegal state from a specific input compatible with the one or more entry constraints, the static analysis performed without executing the respective reference program, and synthesizing one or more payloads from the determined entry constraints.

12. A computer program product according to claim 11, and further comprising instructions for computing structural invariant constraints over the synthesized payloads and synthesizing additional payloads compatible with the computed constraints.

13. A computer program product according to claim 12, and further comprising instructions for verifying that the additional payloads are compatible with the determined entry constraints.

14. A computer program product according to claim 11, wherein the instructions for analyzing each specification comprise instructions for traversing backwards a control flow graph of the control locations.

15. A computer program product according to claim 11, wherein the target system is a web service and the at least one aspect of the target system includes a security function of the web service.

* * * * *